United States Patent
Xie et al.

(10) Patent No.: US 8,750,220 B2
(45) Date of Patent: Jun. 10, 2014

(54) METHOD, ROAMING PROCESSING DEVICE AND COMMUNICATION SYSTEM FOR IMPLEMENTING INTERNATIONAL ROAMING

(75) Inventors: Yanlu Xie, Beijing (CN); Ying He, Beijing (CN); Yaoyao Yin, Beijing (CN); Hua Fan, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 873 days.

(21) Appl. No.: 12/922,063

(22) PCT Filed: Mar. 11, 2009

(86) PCT No.: PCT/CN2009/000259
§ 371 (c)(1),
(2), (4) Date: Sep. 10, 2010

(87) PCT Pub. No.: WO2009/111949
PCT Pub. Date: Sep. 17, 2009

(65) Prior Publication Data
US 2011/0007726 A1    Jan. 13, 2011

(30) Foreign Application Priority Data

Mar. 11, 2008    (CN) .......................... 2008 1 0101746

(51) Int. Cl.
*H04W 4/00* (2009.01)
(52) U.S. Cl.
USPC ............ 370/329; 370/310; 370/328; 370/331
(58) Field of Classification Search
None
See application file for complete search history.

(56) References Cited

U.S. PATENT DOCUMENTS

| 6,738,622 | B1 * | 5/2004 | Stadelmann et al. | 455/435.1 |
| 2004/0005892 | A1 * | 1/2004 | Mayer et al. | 455/432.1 |
| 2004/0032844 | A1 * | 2/2004 | Lewis et al. | 370/338 |
| 2004/0224680 | A1 * | 11/2004 | Jiang | 455/433 |

(Continued)

FOREIGN PATENT DOCUMENTS

| CN | 1416293 A | 5/2003 |
| CN | 19255691 A | 3/2007 |
| CN | 101060674 A | 10/2007 |

OTHER PUBLICATIONS

Mobile Application Part Interface(MAPI) Specification, Versions 1.1 Edition 1.20110510, Oct. 28, 2011.*

(Continued)

*Primary Examiner* — Hassan Phillips
*Assistant Examiner* — Gautam Sharma
(74) *Attorney, Agent, or Firm* — Workman Nydegger (57) ABSTRACT

There are disclosed an international roaming method, a roaming processing device and a communication system for international roaming of an international roaming subscriber of a first operator in a third operator network. When the international roaming subscriber of the first operator provided with a first operator IMSI and a second operator IMSI roams in the third operator network, the roaming processing device of a second operator modifies a first signaling message from a first operator network and carrying the first operator IMSI to a second signaling message carrying the second operator IMSI and transmits the second signaling message to the third operator network, and modifies a third signaling message from the third operator network and carrying the second operator IMSI to a fourth signaling message carrying the first operator IMSI and transmits the fourth signaling message to the first operator network. There is also disclosed a gateway device.

6 Claims, 4 Drawing Sheets

(56) References Cited

U.S. PATENT DOCUMENTS

| | | | | |
|---|---|---|---|---|
| 2004/0242225 | A1* | 12/2004 | Wang | 455/432.1 |
| 2005/0070278 | A1* | 3/2005 | Jiang | 455/432.3 |
| 2006/0003775 | A1* | 1/2006 | Bull et al. | 455/456.1 |
| 2006/0281492 | A1* | 12/2006 | Jiang | 455/558 |
| 2010/0291924 | A1* | 11/2010 | Antrim et al. | 455/433 |
| 2012/0142314 | A1* | 6/2012 | Mohammed | 455/411 |

OTHER PUBLICATIONS

International Search Report of PCT/CN2009/000259 Dated June 18, 2009 With English Translation.

* cited by examiner

FIGURE 7

METHOD, ROAMING PROCESSING DEVICE AND COMMUNICATION SYSTEM FOR IMPLEMENTING INTERNATIONAL ROAMING

CROSS-REFERENCE TO RELATED APPLICATIONS

The present application is a U.S. National Stage of International Application No. PCT/CN2009/000259 filed 11 Mar. 2009, designating the United States, and claiming priority to Chinese Patent Application No. 200810101746.6 filed 11 Mar. 2008.

FIELD OF THE INVENTION

The present invention relates to the field of mobile communications and particularly to an international roaming technology.

BACKGROUND OF THE INVENTION

International Roaming (IR) refers to that a mobile subscriber who has subscribed in a Public Land Mobile Network (PLMN) of an operator in a country or region can have an access to the same mobile communication service in another country or region as in the network of the home operator. The international roaming is allowed only between countries or regions with compatibility of network systems and a bilateral roaming agreement.

In order to facilitate development of the international roaming, the International Roaming Expert Group (IREG) has been established in the International Telecom Union to build standard protocols of a signaling test, an accounting test, etc. Generally the signaling test is referred to as an IREG test and the accounting test is referred to as a Transferred Account Data Interchange Group (TADIG) test. The IREG has built relevant specifications for a guaranteed international roaming capability while proposing a sample of a quality of service that shall be offered to a mobile subscriber roaming from a network of a local operator to that of another operator. The international roaming involves aspects of, for example, a communication link (signaling and traffic) solution, an accounting data transferring solution, an international roaming fee and settlement solution, etc., for each of which an operator is required to offer significant investment, technical supports and accompanying capital and traffic management measures.

In order to provide a mobile subscriber with a high-quality international roaming service, an operator has to cooperate with another operator to set up bilateral roaming and be responsible for network software and hardware reconstruction and maintenance. The bilateral roaming is long-term and complex, and involves major issues including negotiating about a bilateral roaming agreement between the operators, IREG and TADIG tests for both of the roaming parties, signaling site lease and signaling forwarding, a settlement center design and a settlement flow, etc. A less powerful operator usually has insufficient other operators to sign bilateral roaming agreements with, so that a limited number of roaming areas are accessible to mobile subscribers who have subscribed in a network of the less powerful operator, thus restricting a demand of these mobile subscribers for the international roaming and frustrating an experience of the subscribers; and for the operator, the setting up of the international roaming through achieving a bilateral roaming agreement with another operator is time-consuming and involves issues of cross tests and signaling routing between various parties, which may hinder rapid spreading of a coverage area of the international roaming for the operator and consequently hinder an increase of its revenue on the international roaming.

SUMMARY OF THE INVENTION

Embodiments of the invention provide a roaming processing device, a gateway device, and a communication system for implementing international roaming. Based upon the new roaming processing device, embodiments of the invention further provide a method for forwarding a signaling message, a method for location updating and international roaming calling and called methods, to enable international roaming of an international roaming subscriber of a first operator in a network of a third operator.

An embodiment of the invention provides a roaming processing device including:

a signaling transceiver unit adapted to transmit and receive a signaling message;

a storage unit adapted to store a mapping relationship between a first operator International Mobile Subscriber Identifier, IMSI, and a second operator IMSI, both of which are configured for an international roaming subscriber of a first operator; and a signaling processing unit adapted to receive a first signaling message carrying the first operator IMSI from a network of the first operator through the signaling transceiver unit, change the first operator IMSI carried in the first signaling message to the second operator IMSI according to the mapping relationship to generate a second signaling message, and return the second signaling message to the signaling transceiver unit; and receive a third signaling message carrying the second operator IMSI from a third operator network where the international roaming subscriber of the first operator roams through the signaling transceiver unit, change the second operator IMSI carried in the third signaling message to the first operator IMSI according to the mapping relationship to generate a fourth signaling message, and return the fourth signaling message to the signaling transceiver unit.

An embodiment of the invention provides a gateway device including:

a signaling transceiver unit adapted to transmit and receive a signaling message;

a storage unit adapted to store an IMSI number segment of a first operator and an IMSI number segment of a second operator reserved for an international roaming subscriber of the first operator by the second operator; and a control unit adapted to forward a signaling message received by the signaling transceiver unit to a roaming processing device upon determining that an IMSI carried in the signaling message is included in the IMSI number segment of the first operator or the IMSI number segment of the second operator, and forward, through the signaling transceiver unit, a signaling message returned from the roaming processing device.

An embodiment of the invention provides a communication system for implementing international roaming including a gateway device and a roaming processing device of a second operator, wherein:

the gateway device is adapted to forward a received signaling message to the roaming processing device upon determining, from an IMSI number segment of a first operator and an IMSI number segment of the second operator reserved for an international roaming subscriber of the first operator by the second operator, that an IMSI carried in the signaling message is included in the IMSI number segment of the first operator or the IMSI number segment of the second operator and forward a signaling message returned from the roaming processing device; and the roaming processing device is adapted to change a first operator IMSI carried in a first signaling message forwarded from the gateway device to a second operator IMSI according to a stored mapping relationship between the first operator IMSI and the second operator IMSI to generate a second signaling message, and transmit, through the gateway device, the second signaling message to a third operator network where the international roaming subscriber of the first operator roams; and change the second operator IMSI carried in a third signaling message forwarded from the gateway device to the first operator IMSI to generate a fourth signaling message, and transmit, through the gateway device, the fourth signaling message to a first operator network, wherein both of the first operator IMSI and the second operator IMSI are configured for the international roaming subscriber of the first operator.

An embodiment of the invention provides a method for forwarding a signaling message including:

receiving, by a roaming processing device of a second operator, a first signaling message carrying a first operator IMSI forwarded from a gateway device of the second operator, changing the first operator IMSI carried in the first signaling message to a second operator IMSI according to a mapping relationship between the first operator IMSI and the second operator IMSI, both of which are configured for an international roaming subscriber of a first operator, to generate a second signaling message, and transmitting, through the gateway device, the second signaling message to a third operator network where the international roaming subscriber of the first operator roams, wherein the first signaling message is from a first operator network; and receiving, by the roaming processing device, a third signaling message carrying the second operator IMSI forwarded from the gateway device, changing the second operator IMSI carried in the third signaling message to the first operator IMSI according to the mapping relationship to generate a fourth signaling message, and transmitting, through the gateway device, the fourth signaling message to the first operator network, wherein the third signaling message is from the third operator network.

An embodiment of the invention provides a method for location updating of international roaming including:

activating a second operator IMSI for an international roaming subscriber of a first operator that is provided with both a first operator IMSI and the second operator IMSI and roams in a third operator network, and transmitting, from the third operator network, first location updating signaling carrying the second operator IMSI to a gateway device of a second operator;

forwarding, by the gateway device, the first location updating signaling to a roaming processing device of the second operator upon determining that the IMSI carried in the first location updating signaling is included in a stored IMSI number segment of the second operator;

changing, by the roaming processing device, the second operator IMSI carried in the first location updating signaling to the first operator IMSI according to a stored mapping relationship between the first operator IMSI and the second operator IMSI, and transmitting the modified first location updating signaling to a first operator network through the gateway device;

transmitting, from the first operator network, second location updating signaling carrying the first operator IMSI to the gateway device in response to the received first location updating signaling; forwarding, by the gateway device, the second location updating signaling to the roaming processing device upon determining that the IMSI carried in the second location updating signaling is included in a stored IMSI number segment of the first operator; and changing, by the roaming processing device, the first operator IMSI carried in the second location updating signaling to the second operator IMSI according to the mapping relationship, and transmitting the modified second location updating signaling to the third operator network through the gateway device.

An embodiment of the invention provides a calling method for international roaming including:

activating a second operator IMSI for an international roaming subscriber of a first operator that is provided with both a first operator IMSI and the second operator IMSI and roams in a third operator network, and acquiring, by a second operator network, a roaming number of a called subscriber when the international roaming subscriber of the first operator initiates a voice call to the called subscriber; and connecting, by the second operator network, the voice call to the called subscriber according to the MSRN of the called subscriber.

An embodiment of the invention provides a called method for international roaming including:

activating a second operator IMSI for an international roaming subscriber of a first operator that is provided with both a first operator IMSI and the second operator IMSI and roams in a third operator network, and transmitting, from a first operator network, first called signaling carrying the first operator IMSI to a gateway device of a second operator when a calling subscriber initiates a voice call to the international roaming subscriber of the first operator;

forwarding, by the gateway device, the first called signaling to a roaming processing device of the second operator upon determining that the IMSI carried in the first called signaling is included in a stored IMSI number segment of the first operator;

changing, by the roaming processing device the first operator IMSI carried in the first called signaling to the second operator IMSI according to a stored mapping relationship between the first operator IMSI and the second operator IMSI, and transmitting the modified first called signaling to the third operator network through the gateway device;

transmitting, from the third operator network, second called signaling carrying the second operator IMSI to the gateway device in response to the received first called signaling;

forwarding, by the gateway device, the second called signaling to the roaming processing device upon determining that the IMSI carried in the second called signaling is included in a stored IMSI number segment of the second operator; and changing, by the roaming processing device, the second operator IMSI carried in the second called signaling to the first operator IMSI according to the mapping relationship, and transmitting the modified second called signaling to the first operator network through the gateway device.

An embodiment of the invention provides a method for updating the location of international roaming including:

transmitting, from a first operator network, first location updating signaling carrying a third operator IMSI to a gateway device of a second operator when a subscriber of a third operator roams in the first operator network;

modifying, by the gateway device, a source address of the first location updating signaling to an identifier of the gateway device of the second operator and a destination address thereof to an identifier of a gateway device of the third operator, and transmitting the modified first location updating signaling to a third operator network;

transmitting, from the third operator network, second location updating signaling carrying the third operator IMSI to the gateway device in response to the received first location updating signaling; and modifying, by the gateway device, a source address of the second location updating signaling to the identifier of the gateway device of the second operator and a destination address thereof to an identifier of a gateway device of a first operator, and transmitting the modified second location updating signaling to the first operator network.

In the embodiments of the invention, a new roaming processing device is arranged in a second operator network to implement international roaming of an international roaming subscriber of a first operator in a dual IMSI solution, in which the roaming processing device perform a function of changing IMSI information in a signaling message and the signaling message is forwarded through a gateway device of a second operator without any signed bilateral roaming agreement of the first operator with a third operator, so that the signaling message can be modified and forwarded over the second operator network, thereby implementing international roaming of the international roaming subscriber of the first operator in a third operator network and hence spreading rapidly an international roaming coverage area of the first operator.

DETAILED DESCRIPTION OF THE EMBODIMENTS

Firstly several fundamental concepts are defined for the ease of description. In an embodiment of the invention, a less powerful operator with a limited number of bilateral roaming agreements is referred to as a first operator, a PLMN of the first operator is referred to as a first operator network, and a mobile subscriber who has subscribed in the first operator network and desires to register for an international roaming service is referred to as an international roaming subscriber of the first operator; and an operator with a cooperative relationship with the first operator and providing the international roaming subscriber of the first operator with the international roaming service is referred to as a second operator; and all of roaming partner operators with a bilateral roaming agreement with the second operator are referred collectively to as a third operator. In an embodiment of the invention, it is assumed that the first operator does not sign a bilateral roaming agreement with the third operator, in this case, the international roaming of the international roaming subscriber of the first operator is not allowed in a third operator network in the prior art but is allowed through cooperation between the first and second operators in a method for implementing the international roaming according to an embodiment of the invention.

In an embodiment of the invention, the international roaming of an international roaming subscriber of the first operator can be implemented in the third operator network in a dual International Mobile Subscriber Identifier (IMSI) solution. An IMSI is a number in a PLMN to identify a mobile subscriber and includes a Mobile Country Code (MCC), a Mobile Network Code (MNC) and a Mobile Subscriber Identity Number (MSIN), where the MCC identifies a country where the mobile subscriber registers, the MNC identifies a home network of the mobile subscriber and constitutes a PLMN value of the operator together with the MCC, and the MSIN identifies the mobile subscriber within a PLMN service area and is composed of a Home Location Register Identifier (HLR ID) and a subscriber number in a Home Location Register (HLR).

In the dual IMSI solution, the first operator presets an IMSI number segment in which a first operator IMSI is assigned to its subscriber requiring the international roaming to be distinguished from an IMSI of a regular mobile subscriber with no need for international roaming in the first operator network; and the second operator reserves an IMSI number segment for the first operator, and the first operator assigns its subscriber requiring the international roaming with a second operator IMSI from the IMSI number segment of the second operator reserved by the second operator. The first operator may issue to its subscriber requiring the international roaming a special Subscriber Identity Module (SIM) card in which both the first operator IMSI and the second operator IMSI are configured. A subscriber possessing the special SIM card is referred to as an international roaming subscriber of the first operator, the first operator IMSI is activated when the international roaming subscriber of the first operator is located in the first operator network and the second operator IMSI is activated during the international roaming of the international roaming subscriber of the first operator in the third operator network. Since the first operator signs no bilateral roaming agreement with the third operator, during the international roaming of the international roaming subscriber of the first operator within the third operator network, the second operator IMSI is activated due to illegality of the configured first operator IMSI. Alike, each of the IMSIs in the IMSI number segment of the second operator may be set as illegal by data configuration in the first operator network so that the first operator IMSI is activated when the international roaming subscriber of the first operator will is located in the first operator network. Alternatively, an SIM card may be replaced, that is, the international roaming subscriber of the first operator has his or her terminal equipped with an SIM card configured with the first operator IMSI when being located in the first operator network and has his or her terminal equipped with an SIM card configured with the second operator IMSI during international roaming in the third operator network, without changing a mobile phone number of the subscriber.

Thus, the international roaming of an international roaming subscriber of the first operator is easily allowed in the third operator network merely by having the first operator perform a connectivity test with the second operator without signing any bilateral roaming agreement with the third operator or performing processes of an IREG, TADIG test, etc.

Figure 1:
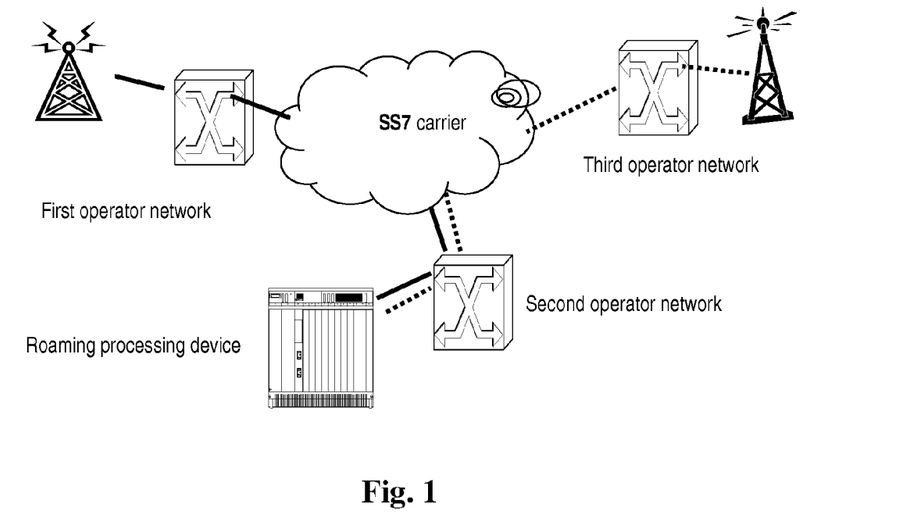
FIG. 1 is a schematic diagram showing a network structure of an international roaming according to an embodiment of the invention.

An embodiment of the invention generally relates to mobile communication networks of three parties, i.e., a first operator network, a second operator network and a third operator (i.e., a cooperative partner for bilateral roaming of the second operator) network, as illustrated in FIG. 1, signaling is transmitted over a Signaling System Number 7 (SS7) carrier among the three parties, and in practice, a gateway device (also referred to as an international gateway office) is arranged in each of the three operator networks to transmit and receive an international signaling message. In enable the international roaming of an international roaming subscriber of the first operator, a new roaming processing device (also referred to as a roaming platform) is arranged in the second operator network to modify a signaling message between the first operator and the second operator so as to ensure transparency of the first operator network to the third operator network. In order to modify a signaling message, a mapping relationship between a first operator IMSI and a second operator IMSI both configured for the international roaming subscriber of the first operator is stored in the roaming processing device. For example, if the first operator IMSI and the second operator IMSI configured for the international roaming subscriber of the first operator are represented as ABCD and EFGH, respectively, the roaming processing device stores a mapping relationship between ABCD and EFGH.

For signaling and routing, the signaling is forwarded via the roaming processing device (also referred to as a roaming platform) and the gateway device (also referred to as an #international gateway office) of the second operator by means of signaling relay by the roaming processing device. The gateway device of the second operator may be preconfigured so that a preset IMSI number segment of the first operator and an IMSI number segment of the second operator reserved for the first operator by the second operator are stored, in order to determine, from an IMSI carried in a signaling message, the signaling message to be forwarded to the roaming processing device.

Figure 2:
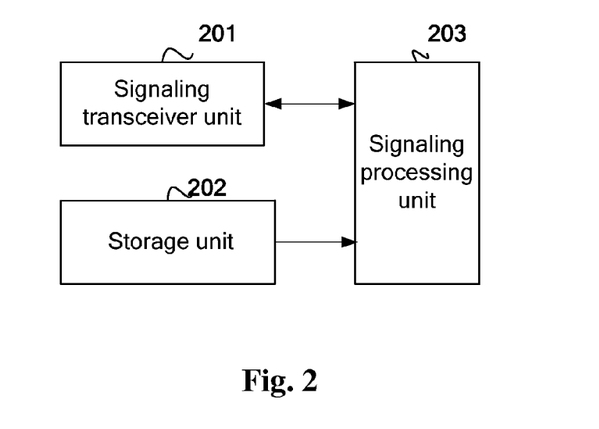
FIG. 2 is a schematic diagram showing a structure of a roaming processing device according to an embodiment of the invention.

A possible structure of a roaming processing device is illustrated in FIG. 2, and the roaming processing device includes:

a signaling transceiver unit 201 adapted to transmit and receive a signaling message;

a storage unit 202 adapted to store a mapping relationship between a first operator IMSI and a second operator IMSI, both of which are configured for an international roaming subscriber of a first operator; and a signaling processing unit 203 adapted to receive a first signaling message carrying the first operator IMSI from a first operator network through the signaling transceiver unit 201, change the first operator IMSI carried in the first signaling message to the second operator IMSI according to the mapping relationship stored in the storage unit 202 to generate a second signaling message, and return the second signaling message to the signaling transceiver unit 201; and the signaling processing unit 203 is further adapted to receive a third signaling message carrying the second operator IMSI from a third operator network where the international roaming subscriber of the first operator roams through the signaling transceiver unit 201, change the second operator IMSI carried in the third signaling message to the first operator IMSI according to the mapping relationship stored in the storage unit 202 to generate a fourth signaling message, and return the fourth signaling message to the signaling transceiver unit 201.

A source address of the first signaling message is an identifier of a gateway device of the first operator and a destination address of the first signaling message is an identifier of a gateway device of a second operator, and address information of the second signaling message generated from the first signaling message may be modified by the roaming processing device, that is, the signaling processing unit 203 is further adapted to modify a source address of the second signaling message as the identifier of the gateway device of the second operator and a destination address thereof as an identifier of a gateway device of a third operator.

A source address of the third signaling message is the identifier of the gateway device of the third operator and a destination address of the third signaling message is the identifier of the gateway device of the second operator, and address information of the fourth signaling message generated from the third signaling message may be modified by the roaming processing device, that is, the signaling processing unit 203 is further adapted to modify a source address of the fourth signaling message as the identifier of the gateway device of the second operator and a destination address thereof as the identifier of the gateway device of the first operator.

Alternatively, the roaming processing device may not modify the address information of the second signaling message or the fourth signaling message, but return the second signaling message and the fourth signaling message directly to the gateway device of the second operator which modifies the address information.

Figure 3:
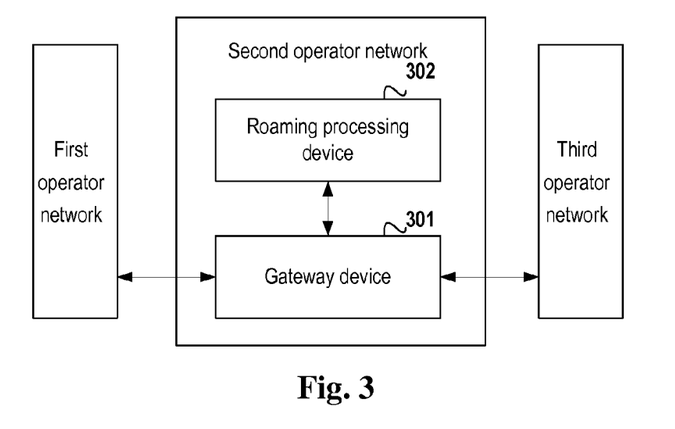
FIG. 3 is a block diagram of a communication system for implementing the international roaming according to an embodiment of the invention.

Based upon the new roaming processing device, an embodiment of the invention provides a communication system for implementing the international roaming, as illustrated in FIG. 3, and the communication system includes a gateway device 301 and a roaming processing device 302 of a second operator.

The gateway device 301 is adapted to forward a received signaling message to the roaming processing device 302 upon determining, according to an IMSI number segment of a first operator and an IMSI number segment of the second operator reserved for an international roaming subscriber of the first operator by the second operator, that an IMSI carried in the signaling message is included in the IMSI number segment of the first operator or the IMSI number segment of the second operator, and forward a signaling message returned from the roaming processing device 302.

The roaming processing device 302 is adapted to change a first operator IMSI carried in a first signaling message forwarded from the gateway device 301 to a second operator IMSI according to a stored mapping relationship between the first operator IMSI and the second operator IMSI to generate a second signaling message, and transmit, through the gateway device 301, the second signaling message to a third operator network where the international roaming subscriber of the first operator roams; and change the second operator IMSI carried in a third signaling message forwarded from the gateway device 301 to the first operator IMSI to #generate a fourth signaling message, and transmit, through the gateway device 301, the fourth signaling message to a first operator network; here, both of the first operator IMSI and the second operator IMSI are configured for the international roaming subscriber of the first operator.

Address information of the second signaling message and the fourth signaling message is modified by the gateway device 301 or the roaming processing device 302.

Figure 4:
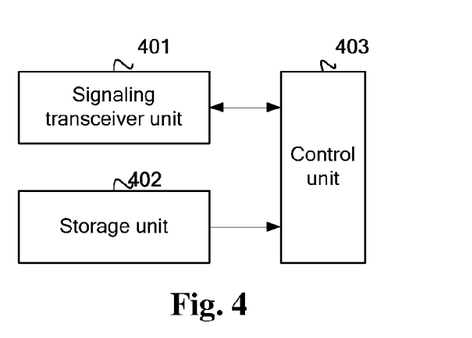
FIG. 4 is a schematic diagram showing a structure of a gateway device according to an embodiment of the invention.

A possible structure of the gateway device 301 as illustrated in FIG. 4 includes:

a signaling transceiver unit 401 adapted to transmit and receive a signaling message;

a storage unit 402 adapted to store an IMSI number segment of a first operator and an IMSI number segment of a second operator reserved for an international roaming subscriber of the first operator by the second operator; and a control unit 403 adapted to forward the signaling message received by the signaling transceiver unit 401 to a roaming processing device upon determining that an IMSI carried in the signaling message is included in the IMSI number segment of the first operator or the IMSI number segment of the second operator, and forward, through the signaling transceiver unit 401, a signaling message returned from the roaming processing device.

When address information of a signaling message needs modification by the gateway device, the control unit 403 is further adapted to modify a source address of a signaling message from a first operator network to an identifier of a gateway device of the second operator and modify a destination address of the signaling message to an identifier of a gateway device of a third operator; and modify a source address of a signaling message from a third operator network, where the international roaming subscriber of the first operator roams, to the identifier of the gateway device of the second operator and modify a destination address of the signaling message to an identifier of a gateway device of the first operator.

Figure 5:
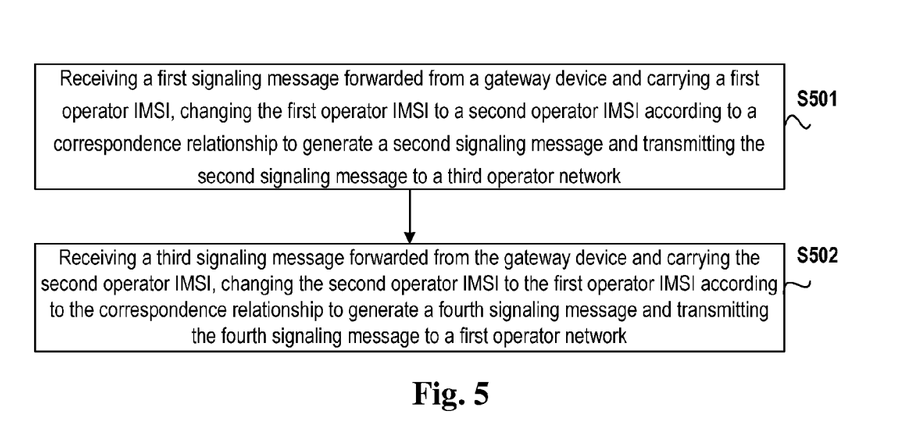
FIG. 5 is a flow chart of a method for forwarding a signaling message according to an embodiment of the invention.

Based upon the foregoing analysis, an embodiment of the invention provides a method for forwarding a signaling message, as illustrated in FIG. 5, and the method includes:

S501. a roaming processing device of a second operator receives a first signaling message carrying a first operator IMSI forwarded from a gateway device of the second operator, changes the first operator IMSI carried in the first signaling message to a second operator IMSI according to a mapping relationship between the first operator IMSI and the second operator IMSI, both of which are configured for an international roaming subscriber of a first operator, to generate a second signaling message, and transmits, through the gateway device, the second signaling message to a third operator network, here, the first signaling message is from a first operator network; and S502. the roaming processing device of the second operator receives a third signaling message carrying the second operator IMSI forwarded from the gateway device of the second operator, changes the second operator IMSI carried in the third signaling message to the first operator IMSI according to the mapping relationship, to generate a fourth signaling message, and transmits, through the gateway device, the fourth signaling message to the first operator network, here, the third signaling message is from the third operator network.

The gateway device forwards the received signaling message to the roaming processing device upon determining that the IMSI carried in the signaling message is included in a stored IMSI number segment of the first operator or IMSI number segment of the second operator, and the foregoing processes are performed.

The gateway device forwards the signaling message from the first operator network directly to the third operator network and the signaling message from the third operator network directly to the first operator network upon determining that the IMSI carried in the received signaling message is not included in the stored IMSI number segment of the first operator or IMSI number segment of the second operator.

In the embodiments of the invention, the signaling and routing flows for the international roaming of the international roaming subscriber of the first operator visiting the third operator network is illustrated. During visiting of the international roaming subscriber of the first operator, the general signaling and routing flows include a location update flow, a calling flow and a called flow, and also involve a settlement service flow for in the case of settlement of the international roaming, which will be detailed below in embodiments thereof.

An international roaming subscriber of a first operator is provided with both a first operator IMSI and a second operator IMSI, and the first operator IMSI is activated when the international roaming subscriber is located in a first operator network while the second operator IMSI is activated during the roaming of the international roaming subscriber in a third operator network, with a second operator network modifying and forwarding a signaling message. Hereinafter, descriptions will be made to an example in which a roaming processing device modifies both an IMSI and address information carried in the signaling message, and detailed descriptions of a scenario in which a gateway device of a second operator modifies the address information will be omitted here.

A First Embodiment

Figure 6:
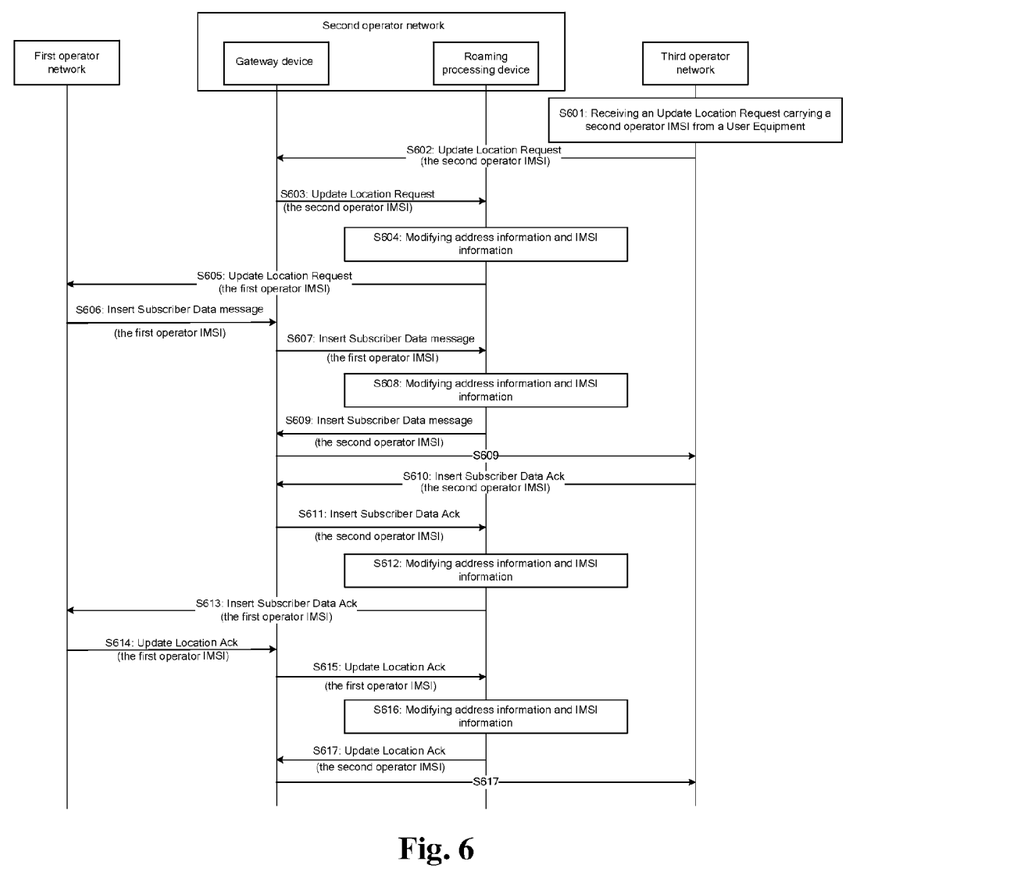
FIG. 6 is a flow chart of updating the location of a visiting international roaming subscriber of a first operator according to a first embodiment of the invention.

The first embodiment provides a flow of updating the location of an international roaming subscriber of a first operator that roams in a third operator network, as illustrated in FIG. 6, and the flow includes:

S601. when the international roaming subscriber of the first operator roams in the third operator network, a preconfigured second operator IMSI is activated, and a User Equipment of the international roaming subscriber of the first operator transmits an Update Location Request carrying the second operator IMSI to the network side;

S602. the third operator network forwards the Update Location Request to a second operator network;

S603. a gateway device of a second operator forwards the Update Location Request to a roaming processing device according to the IMSI;

the gateway device of the second operator is preconfigured with an IMSI number segment of the first operator and an IMSI number segment of the second operator reserved for the first operator by the second operator, and forwards the Update Location Request to the roaming processing device of the second operator upon determining, from the second operator IMSI carried in the Update Location Request, that the IMSI is included in the IMSI number segment of the second operator;

S604. the roaming processing device changes the second operator IMSI carried in the Update Location Request to a corresponding first operator IMSI, modifies a source address of the Update Location Request from an identifier of a gateway device of a third operator to an identifier of the gateway device of the second operator and modifies a destination address of the Update Location Request from the identifier of the gateway device of the second operator to an identifier of a gateway device of the first operator;

S605. the roaming processing device transmits the modified Update Location Request to the gateway device of the second operator, which in turn forwards it to a first operator network;

S606. the first operator network transmits an Insert Subscriber Data message carrying the first operator IMSI to the second operator network in response to the received Update Location Request;

S607. the gateway device of the second operator forwards the Insert Subscriber Data message to the roaming processing device according to the IMSI carried in the Insert Subscriber Data message;

S608. the roaming processing device changes the first operator IMSI carried in the Insert Subscriber Data message to the second operator IMSI, modifies a source address of the Insert Subscriber Data message from the identifier of the gateway device of the first operator to the identifier of the gateway device of the second operator, and modifies a destination address of the Inset Subscriber Data message from the identifier of the gateway device of the second operator to the identifier of the gateway device of third operator;

S609. the roaming processing device forwards the modified Insert Subscriber Data message to the gateway device of the second operator, which in turn forwards it to the third operator network;

S610. the third operator network responds to the second operator network with an Insert Subscriber Data Ack message carrying the second operator IMSI;

S611. the gateway device of the second operator forwards the Insert Subscriber Data Ack message to the roaming processing device according to the IMSI carried in the Insert Subscriber Data Ack message;

S612. the roaming processing device changes the second operator IMSI carried in the Insert Subscriber Data Ack message to the first operator IMSI, modifies a source address of the Insert Subscriber Data Ack message from the identifier of the gateway device of the third operator to the identifier of the gateway device of the second operator, and modifies a destination address of the Insert Subscriber Data Ack message from the identifier of the gateway device of the second operator to the identifier of the gateway device of the first operator;

S613. the roaming processing device transmits the modified Insert Subscriber Data Ack message to the gateway device of the second operator, which in turn forwards it to the first operator network;

S614. the first operator network responds to the second operator network with an Update Location Ack message carrying the first operator IMSI;

S615. the gateway device of the second operator forwards the Update Location Ack message to the roaming processing device according to the IMSI carried in the Update Location Ack;

S616. the roaming processing device changes the first operator IMSI carried in the Update Location Ack message to the second operator IMSI, modifies a source address of the Update Location Ack message from the identifier of the gateway device of the first operator to the identifier of the gateway device of the second operator, and modifies a destination address of the Update Location Ack message from the identifier of the gateway device of the second operator to the identifier of the gateway device of the third operator; and S617. the roaming processing device transmits the modified Update Location Ack message to the gateway device of the second operator, which in turn forwards it to the third operator network.

So far the exchange of the signaling messages has been completed between the first operator and the third operator through the second operator to update the location of the international roaming subscriber of the first operator visiting the third operator network, making the international roaming subscriber of the first operator ready for accessing the international roaming service.

The signaling messages involved in the present embodiment include the Update Location Request, the Insert Subscriber Data, the Insert Subscriber Data Ack and the Update Location Ack, all of which may be referred to as location updating signaling, where the Update Location Request and the Insert Subscriber Data Ack from the third operator network and carrying the second operator IMSI may be referred to as first location updating signaling, and the Insert Subscriber Data and the Update Location Ack from the first operator network and carrying the first operator IMSI may be referred to as second location updating signaling.

A Second Embodiment

The second embodiment provides a calling flow of an international roaming subscriber of a first operator that roams in a third operator network, which does not involve a roaming processing device of a second operator and an international roaming calling service can be utilized by the international roaming subscriber of the first operator in the third operator network according to an activated second operator IMSI, and the flow includes:

a. when the international roaming subscriber of the first operator roams in the third operator network, the preconfigured second operator IMSI is activated;

b. the international roaming subscriber of the first operator initiates a voice call to a called subscriber, and a second operator network transmits a Send Routing Info message carrying a called IMSI to a called HLR;

c. the called HLR transmits a Provide Roaming Number request carrying the called IMSI to a called switch;

d. the called switch responds to the called HLR with a Provide Roaming Number Ack message, which provides a Mobile Subscriber Roaming Number (MSRN) of the called subscriber corresponding to the called IMSI, here, the MSRN is a number allocated temporarily to a called mobile subscriber by a Visitor Locator Register (VLR) in response to a request of an HLR for the purpose of routing reselection in the network and releasable immediately after a connection is finished so as to be available to another mobile subscriber;

e. the called HLR responds to the second operator network with a Send Routing Info Ack message providing the MSRN of the called subscriber; and f. the second operator network connects the voice call to the called subscriber according to the MSRN of the called subscriber, thus ringing for the called subscriber.

A Third Embodiment

Figure 7:
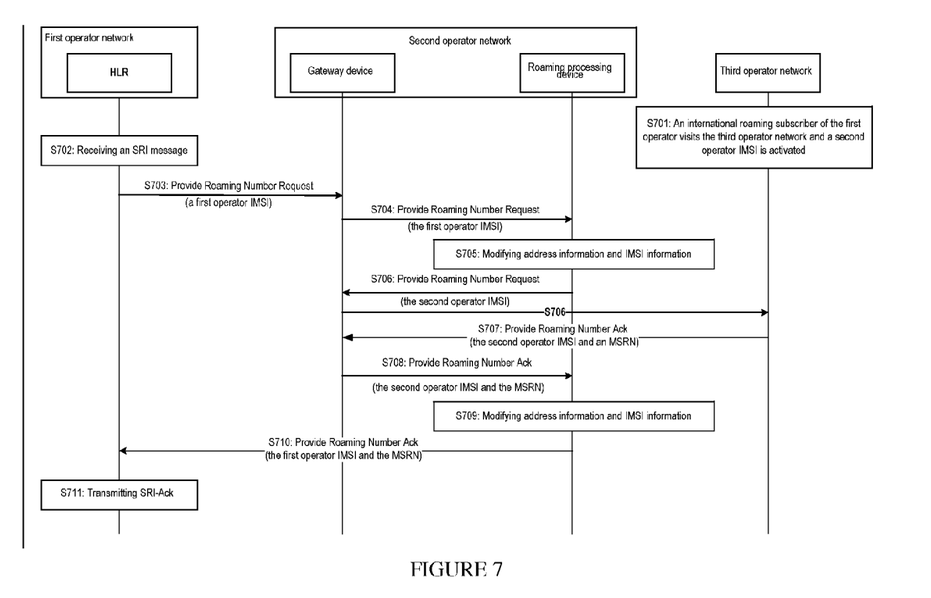
FIG. 7 is a called flow chart of a visiting international roaming subscriber of a first operator in a third embodiment of the invention.

The third embodiment provides a called flow of an international roaming subscriber of a first operator that roams in a third operator network, as illustrated in FIG. 7, and the flow includes:

S701: when the international roaming subscriber of the first operator roams in the third operator network, a preconfigured second operator IMSI is activated;

S702: a calling subscriber initiates a voice call to the international roaming subscriber of the first operator, and an HLR of the first operator receives a Send Routing Info (SRI) message;

S703: a first operator network transmits a Provide Roaming Number (PRN) request carrying a first operator IMSI to a second operator network;

S704: a gateway device of a second operator forwards the Provide Roaming Number request to a roaming processing device according to the first operator IMSI;

S705: the roaming processing device changes the first operator IMSI carried in the Provide Roaming Number request to the second operator IMSI, modifies a source address of the Provide Roaming Number request from an identifier of a gateway device of the first operator to an identifier of the gateway device of the second operator, and modifies a destination address of the Provide Roaming Number request from the identifier of the gateway device of the second operator to an identifier of a gateway device of a third operator;

S706: the roaming processing device transmits the modified Provide Roaming Number request to the gateway device of the second operator, which in turn forwards it to the third operator network;

S707: the third operator network responds to the second operator network with a Provide Roaming Number Ack message carrying the second operator IMSI, which provides an MSRN of the international roaming subscriber of the first operator corresponding to the second operator IMSI;

S708: the gateway device of the second operator forwards the Provide Roaming Number Ack message to the roaming processing device according to the IMSI carried in the Provide Roaming Number Ack message;

S709: the roaming processing device changes the second operator IMSI carried in the Provide Roaming Number Ack message to the first operator IMSI, modifies a source address of the Provide Roaming Number Ack message from the identifier of the gateway device of the third operator to the identifier of the gateway device of the second operator, and modifies a destination address of the Provide Roaming Number Ack message from the identifier of the gateway device of the second operator to the identifier of the gateway device of the first operator;

S710: the roaming processing device transmits the modified Provide Roaming Number Ack to the gateway device of the second operator, which in turn forwards it to the first operator network; and S711: the HLR of the first operator responds to the calling subscriber with a Send Routing Info ACK (SRI_Ack) message, providing the MSRN of the international roaming subscriber of the first operator.

Thereafter, the calling subscriber connects the voice call to the international roaming subscriber of the first operator according to the MSRN of the international roaming subscriber of the first operator, thus ringing for the international roaming subscriber of the first operator.

The present embodiment enables the utilization of an international roaming called service by the international roaming subscriber of the first operator in the third operator network through processing and forwarding of a signaling message by the roaming processing device and the gateway device of the second operator.

Both of the signaling messages of Provide Roaming Number and Provide Roaming Number Ack involved in the present embodiment may be referred to as called signaling, where the Provide Roaming Number message from the first operator network and carrying the first operator IMSI may be referred to as a first called signaling, and the Provide Roaming Number Ack message from the third operator network and carrying the second operator IMSI may be referred to as a second called signaling.

Setting up of bilateral roaming involves both signaling and routing flows of the international roaming subscriber of the first operator visiting the third operator network and signaling and routing flows of a subscriber of the third operator visiting the first operator network, the latter generally includes a location update flow, a calling flow and a called flow without involving any processing of the roaming processing device and will be briefly introduced below.

A Fourth Embodiment

In the case that a first operator signs no bilateral roaming agreement with a third operator but a second operator has signed a bilateral roaming agreement with the third operator and provides the first operator with an international roaming service, a flow of updating the location of a subscriber of the third operator visiting a first operator network includes:

A1. the first operator network transmits an Update Location Req message carrying a third operator IMSI to a second operator network;

B1. a gateway device of the second operator directly modifies a source address and a destination address in the Update Location Req message and forwards the Update Location Req message to a third operator network according to the IMSI carried in the Update Location Req message without forwarding it to a roaming processing device;

Specifically, the gateway device modifies the source address of the Update Location Req message from an identifier of a gateway device of the first operator to an identifier of the gateway device of the second operator and the destination address thereof from the identifier of the gateway device of the second operator to an identifier of a gateway device of the third operator;

C1. the third operator network transmits an Insert Subscriber Data message carrying the third operator IMSI to the second operator network, and the gateway device of the second operator directly modifies a source address and a destination address in the Insert Subscriber Data message and forwards the Insert Subscriber Data message to the first operator network according to the IMSI carried in the Insert Subscriber Data message without forwarding it to the roaming processing device;

Specifically, the gateway device of the second operator modifies the source address of the Insert Subscriber Data message from the identifier of the gateway device of the third operator to the identifier of the gateway device of the second operator and the destination address thereof from the identifier of the gateway device of the second operator to the identifier of the gateway device of the first operator;

D1. the first operator network responds to the second operator network with an Insert Subscriber Data Ack message carrying the third operator IMSI, and the gateway device of the second operator directly modifies a source address and a destination address in the Insert Subscriber Data Ack message and forwards the Insert Subscriber Data Ack message to the third operator network according to the IMSI carried in the Insert Subscriber Data Ack message without forwarding it to the roaming processing device;

E1. the third operator network responds to the second operator network with an Update Location Ack message carrying the third operator IMSI, and the gateway device of the second operator directly modifies a source address and a destination address in the Update Location Ack message and forwards the Update Location Ack message to the first operator network according to the IMSI carried in the Update Location Ack message without forwarding it to the roaming processing device.

So far the location updating of the subscriber of the third operator has been completed and a network logo of the first operator is displayed on a User Equipment of the subscriber of the third operator.

The signaling messages involved in the present embodiment include the Update Location Request, the Insert Subscriber Data, the Insert Subscriber Data Ack and the Update Location Ack, all of which may be referred to as location updating signaling, where the Update Location Request and the Insert Subscriber Data Ack from the first operator network and carrying the third operator IMSI may be referred to as first location updating signaling, and the Insert Subscriber Data and the Update Location Ack from the third operator network and carrying the third operator IMSI may be referred to as second location updating signaling.

A Fifth Embodiment

A calling flow of a subscriber of a third operator visiting a first operator network includes:

A2. the subscriber of the third operator visiting the first operator network initiates a call to a called subscriber, and a called HLR receives a Send Routing Info message;

B2. the called HLR transmits a Provide Roaming Number request carrying a called IMSI to a called switch;

C2. the called switch responds to the called HLR with a Provide Roaming Number Ack message, which provides an MSRN of the called subscriber corresponding to the called IMSI;

D2. the called HLR responds to the first operator network with a Send Routing Info Ack message providing the MSRN of the called subscriber; and E2. the first operator network connects the call to the called subscriber according to the MSRN of the called subscriber, thus ringing for the called subscriber.

A Sixth Embodiment

A called flow of a subscriber of a third operator visiting a first operator network includes:

A3. a calling subscriber initiates a call to the subscriber of the third operator visiting the first operator network, and an HLR of the third operator receives a Send Routing Info message;

B3. a third operator network transmits a Provide Roaming Number request carrying a third operator IMSI to a second operator network, and a gateway device of a second operator directly modifies a source address and a destination address in the Provide Roaming Number request and forwards the Provide Roaming Number request to the first operator network according to the IMSI carried in the Provide Roaming Number request without forwarding it to a roaming processing device;

C3. the first operator network responds to the second operator network with a Provide Roaming Number Ack message carrying the third operator IMSI, which provides an MSRN of the subscriber of the third operator corresponding to the third operator IMSI, and the gateway device of the second operator directly modifies a source address and a destination address in the Provide Roaming Number Ack message and forwards the Provide Roaming Number Ack message to the third operator network according to the IMSI carried in the Provide Roaming Number Ack message without forwarding it to the roaming processing device;

D3. the HLR of the third operator responds to the calling subscriber with a Send Routing Info Ack message, providing the MSRN of the subscriber of the third operator; and E3. the calling subscriber connects the call to the subscriber of the third operator according to the MSRN of the subscriber of the third operator, thus ringing for the subscriber of the third operator.

For a settlement service of incoming and outgoing visits, a settlement center is required to be capable of incorporating a Transferred Account Procedure-out (TAP-out) file, resolving a Transferred Account procedure-in (TAP-in) file and converting an IMSI, thereby ensuring successful processing of an accounting bill between the first operator/the second operator and the third operator.

In the embodiments of the invention, a first operator and a second operator cooperate to provide an international roaming subscriber of the first operator with an international roaming service in a dual IMSI solution, in which an additional roaming processing device is arranged in a second operator network to perform a function of modifying address information and IMSI information in a signaling message and forwarding signaling at a gateway device of the second operator, thereby implementing the international roaming of the international roaming subscriber of the first operator in a mobile information network of a cooperative partner for international roaming of the second operator and consequently rapid spreading of an international roaming coverage area of the first operator without any bilateral roaming agreement signed by the first operator with another operator and a complex IREG test, etc.

The embodiments of the invention are applicable particularly to a less powerful operator for which setting up of standard bilateral roaming is a long-term procedure, which may hinder rapid spreading of a roaming coverage area and an increase of roaming revenue. With the dual IMSI solution according to the embodiments of the invention, the international roaming in the third operator network can be set up for a subscriber of the less powerful operator simply by a connectivity test with a cooperative operator, i.e., the second operator involved in the embodiments of the invention, without negotiating about a bilateral roaming agreement and performing an IREG test between the operator and the third operator. Moreover, only a new roaming processing device needs to be arranged in the second operator network in the solution just with minor modification to devices in the network and with an insignificant effort incurred to the second operator and its roaming partner operator.

Finally, it shall be noted that the foregoing embodiments are intended to merely illustrate but not limit the technical solutions in the embodiments of the invention, and although the invention has been detailed with reference to the preferred embodiments, those ordinarily skilled in the art shall appreciate that the technical solutions in the embodiments of the invention may be modified or replaced equivalently without departing from the spirit and scope of the invention.

The invention claimed is:

1. A gateway device, comprising:
   a signaling transceiver unit adapted to transmit and receive a signaling message;
   a storage unit adapted to store an International Mobile Subscriber Identifier, IMSI, number segment of a first operator and an IMSI number segment of a second operator reserved for an international roaming subscriber of the first operator by the second operator; and
   a control unit adapted to forward a signaling message received by the signaling transceiver unit to a roaming processing device upon determining that an IMSI carried in the signaling message is included in the IMSI number segment of the first operator or the IMSI number segment of the second operator, and forward, through the signaling transceiver unit, a signaling message returned from the roaming processing device,
   wherein the control unit is further adapted to modify a source address of a signaling message from a first operator network to an identifier of a gateway device of the second operator,
   modify a destination address of the signaling message from the first operator network to an identifier of a gateway device of a third operator,
   modify a source address of a signaling message from a third operator network, where the international roaming subscriber of the first operator roams, to the identifier of the gateway device of the second operator, and modify a destination address of the signaling message from the third operator network to an identifier of a gateway device of the first operator.

2. A method for forwarding a signaling message, comprising:

receiving, by a roaming processing device of a second operator, a first signaling message carrying a first operator International Mobile Subscriber Identifier, IMSI, forwarded from a gateway device of the second operator, changing the first operator IMSI carried in the first signaling message to a second operator IMSI according to a mapping relationship between the first operator IMSI and the second operator IMSI, both of which are configured for an international roaming subscriber of a first operator, to generate a second signaling message, and transmitting, through the gateway device, the second signaling message to a third operator network where the international roaming subscriber of the first operator roams, wherein the first signaling message is from a first operator network; and receiving, by the roaming processing device, a third signaling message carrying the second operator IMSI forwarded from the gateway device, changing the second operator IMSI carried in the third signaling message to the first operator IMSI according to the mapping relationship to generate a fourth signaling message, and transmitting, through the gateway device, the fourth signaling message to the first operator network, wherein the third signaling message is from the third operator network, wherein the method further comprises:

forwarding, by the gateway device, a received signaling message to the roaming processing device upon determining that an IMSI carried in the signaling message is included in a stored IMSI number segment of the first operator or IMSI number segment of the second operator reserved for an international roaming subscriber of the first operator by the second operator.

3. The method of claim 2, wherein the first signaling message comprises second location updating signaling, and the third signaling message comprises first location updating signaling.

4. The method of claim 3, wherein the first location updating signaling transmitted from the third operator network comprises an Update Location Request transmitted from the international roaming subscriber of the first operator to the third operator network through a User Equipment;

the second location updating signaling transmitted from the first operator network in response to the received Update Location Request comprises an Insert Subscriber Data message;

the first location updating signaling transmitted from the third operator network in response to the received Insert Subscriber Data message comprises an Insert Subscriber Data Ack message; and the second location updating signaling transmitted from the first operator network in response to the received Insert Subscriber Data Ack message comprises an Update Location Ack message.

5. The method of claim 2, wherein the first signaling message comprises first called signaling, and the third signaling message comprises second called signaling.

6. The method of claim 5, wherein the first called signaling comprises a Provide Roaming Number Request transmitted from the first operator network; and the second called signaling transmitted from the third operator network in response to the received Provide Roaming Number Request comprises a Provide Roaming Number Ack message.

* * * * *